3,018,254
RUBBER ANTIOXIDANT DISPERSIONS
Earl Kaplan, North Plainfield, N.J., assignor to American Cyanamid Company, New York, N.Y., a corporation of Maine
No Drawing. Filed Dec. 26, 1957, Ser. No. 705,111
8 Claims. (Cl. 252—403)

This invention relates to rubber antioxidants. More particularly, it relates to highly fluid aqueous dispersions of antioxidants for use in rubber latex and a method of preparing such dispersions.

Many chemical compounds have demonstrated the characteristic to one degree or another of inhibiting the deteriorating action of oxygen on vulcanized rubber. Among the more outstanding of these are certain 2,2'-methylene-bis-4-alkyl-6-t-alkyl phenols in which the alkyl and t-alkyl radicals are of 1–3 and 4–8 carbon atoms respectively. Incorporation into dry rubber of any of the compounds belonging to this class of antioxidant is readily accomplished along with the other compounding ingredients by mechanical mixing, and presents no problem. The same is not true, however, when preparing rubber latex compositions for use in the production of rubber layers, films, threads, foam rubber and the like.

Distribution of antioxidants in latex is conducted in various ways according to their different physical properties. For instance, water-soluble antioxidants may be dissolved directly into latex and thus become uniformly distributed in the final rubber product. Unfortunately, few if any, satisfactory water-soluble antioxidants are available. On the other hand, the distribution of solid water-insoluble antioxidants, such as the bis-dialkylphenols of this invention, is not so simple. The usual procedure is to form a fine aqueous dispersion of the antioxidant prior to its addition to latex. These dispersions usually run about 50% solids and are formed by milling the antioxidant in water in a ball or colloid mill using a suitable dispersing agent.

Aqueous dispersions thus formed of the bis-dialkylphenols of this invention however, have not been satisfactory for commercial application because of their thixotropic nature. The extent to which each antioxidant dispersion suffers from this phenomenon may vary with each antioxidant and often varies with different batches of the same antioxidant. Thus, the dispersion may be fluid when first prepared only to turn into an unpourable, unpumpable mass in a period of a few minutes. In other instances, the dispersion may have no fluidity from the beginning. The disadvantages of such antioxidants to the latex industry are obvious and are such as to dictate the use in latex of other antioxidants, even those which are inferior in their inhibiting action to the bis-dialkylphenols.

There has remained, therefore, a need for a means for rendering bis-dialkylphenols more suitable for use as antioxidants in rubber latex. It is a principal object of this invention to provide this need and to overcome the disadvantages noted above. It is a further object to prepare aqueous dispersions of bis-dialkylphenols for use in rubber latex. It is a further object of this invention to prepare such dispersions which have initially, and retain for extended periods of time, a high fluidity so that they may be readily handled by pumps and allied equipment. It is a still further object of this invention to obtain such a dispersion by a process which is simple, involves no additional equipment requirements nor personnel supervision, and does not in any way adversely affect the subsequent vulcanization process or the vulcanizate so obtained.

According to this invention, these objects have been met in a simple yet extremely successful manner. In general the process of this invention comprises milling an aqueous mixture of an antioxidant of the formula

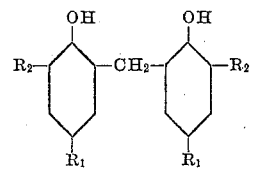

in which $R_1$ is an alkyl radical of 1–3 carbon atoms and $R_2$ is a tertiary alkyl radical of 4–8 carbon atoms to which has been added an agent selected from the group consisting of a self condensation of product of dimethylolethyleneurea and polyvinylpyrrolidone having the formulae

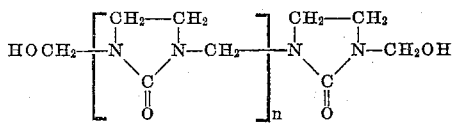

and

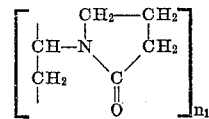

in which $n$ and $n_1$ are at least 1. Exceptionally good results have been obtained when $n$ varies from 2–10 and $n_1$ varies from 200–400. When $n$ and $n_1$ are so varied, the approximate molecular weights of the self condensation products of dimethylolethyleneurea will range from about 200–1000 while that of the polyvinylpyrrolidone will range from about 20,000 to 40,000

In practicing the present invention, dispersions having a solids contents as high as 50% and even higher can be obtained with an initial high fluidity. Particularly surprising, however, is that these dispersions retain their initial high fluidity permitting them to be handled in conventional equipment after extensive periods of time. These results have been obtained by employing as little as 0.5% of agent on the weight of antioxidant. Amounts greater than about 5.0% should preferably not be employed since, quite surprisingly, these greater amounts appear to produce a thickened product. As a usual practice, an amount of agent from about 1.0–3.0% will be found adequate to obtain the desired fluidity.

The preparation of a self condensation product of dimethylolethyleneurea as employed in the process of this invention may be conducted by heating an aqueous reaction mixture of dimethylolethyleneurea and an acid catalyst at 25°–100° C. Various acids may be employed as the catalyst such as hydrochloric acid, sulfuric acid, phosphoric acid and the like in amounts of from 1–10 parts per part of dimethylolethyleneurea. By varying time, temperature and pH, the degree of condensation may be controlled to obtain products having varying numbers of units linked together.

It is immaterial when the agent is added to the aqueous dispersion although, as a practical matter, it is preferable to have it present when forming the dispersion. Thus, an aqueous mixture of antioxidant, dispersing agent and the agent according to this invention is prepared and subjected to milling by suitable means as heretofore done. Alternatively, a mixture less the agent may be milled and the agent added to the resultant dispersion, although this procedure is less practical commercially.

The following examples further illustrate the present invention. Viscosity is used as a measurement of fluidity. Example 1 illustrates the preparation of a self condensation product dimethylolethyleneurea. All parts are by weight unless otherwise noted.

*Example 1*

A mixture of 228 parts of a 50% aqueous solution of dimethylolethyleneurea and 6 parts of concentrated hydrochloric acid is heated to 90° C. over a one hour period. After holding the temperature at 90–95° C. for 75 minutes, the solution is cooled, neutralized with NaOH and dried at 100° C. 88 parts of a self condensation product of dimethylolethyleneurea are obtained having about 3.5 to 4 unit per molecule and a molecular weight of about 360 based on cryoscopic measurements.

*Example 2*

A mixture of 50 parts of 2,2-methylene-bis(4-methyl-6-t-butyl phenol), 48 parts of water and 2 parts of dispersing agent (Daxad 11) is ground at room temperature for 15 minutes in a Szegvari Attritor with 150–200 parts of ceramic ¼" (#002) balls. The initial viscosity of the dispersion so formed is 380 centipoises. After standing for one half hour, the dispersion turned into an almost completely solid state.

*Example 3*

The procedure of Example 2 is repeated except that 1.0% by weight of antioxidant of the product of Example 1 is added to the mixture. The initial viscosity of the dispersion so obtained is found to be 100 centipoises. After standing for 16 hours, the dispersion has a viscosity of 132 centipoises and is readily pumped.

*Example 4*

The procedure of Example 3 is repeated using 48 parts of 2,2'-methylene-bis(4-ethyl-6-t-butyl phenol) and 2% of the product of Example 1. A readily pumpable dispersion having similar viscosity readings to those of Example 3 is obtained.

*Example 5*

The procedure of Example 4 is repeated using 0.5% of a polyvinylpyrrolidone having a molecular weight of about 20,000. A highly fluid dispersion similar to that of Example 4 is obtained.

*Example 6*

Similar results are obtained when the procedure of Example 5 is changed by using 2,2'-methylene-bis(4-methyl-6-t-butyl phenol) and varying the molecular weight and percentage of polyvinylpyrrolidone.

I claim:
1. A fluid, high-solids content dispersion of a 2,2'-methylene-bis(4-alkyl-6-t-alkyl phenol) in which the alkyl and t-alkyl moieties contain 1–3 carbons and 4–8 carbons respectively, in an essentially aqueous medium, said dispersion having incorporated therein from about 0.5 to about 5.0 weight percent of the weight of said bis-dialkyl phenol of an agent selected from the group consisting of the self-condensation products of dimethylolethyleneurea having a molecular weight of from about 200 to about 400 and of polyvinylpyrrolidone having a molecular weight of from about 20,000 to about 40,000 and said dispersion being further characterized by remaining fluid for an extended period of time, at a solids content of fifty weight percent of said bis-dialkyl phenol.

2. A composition according to claim 1 in which the self condensation product of dimethylolethyleneurea and polyvinylpyrrolidone, respectively, have the formulae

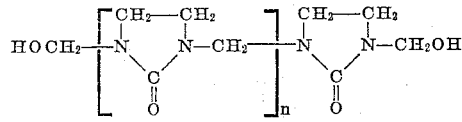

and

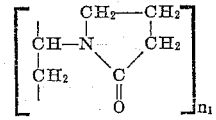

in which $n$ is 2–10 and $n_1$ is 200–400.

3. A composition according to claim 1 in which the bis-phenol is 2,2'-methylene-bis(4-methyl-6-t-butyl phenol) and the agent is a self condensation product of dimethylolethyleneurea.

4. A composition according to claim 1 in which the bis-phenol is 2,2'-methylene-bis(4-ethyl-6-t-butyl phenol) and the agent is a self condensation product of polyvinylpyrrolidone.

5. A composition consisting essentially of a compound of the formula

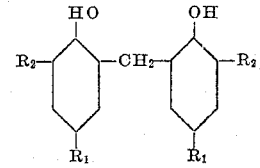

in which $R_1$ is an alkyl of 1–3 carbon atoms and $R_2$ is a tertiary-alkyl of 4–8 carbon atoms, and from about 0.5 to about 5.0 weight percent of the weight of said bis-dialkyl phenol of an agent selected from the group consisting of the self-condensation products of dimethylolethyleneurea having a molecular weight of from about 200 to about 400 and of polyvinylpyrrolidone having a molecular weight of from about 20,000 to about 40,000; said composition being characterized in that when formed into an aqueous dispersion containing fifty percent by weight of said compound, the resultant dispersion is and remains fluid for at least sixteen hours.

6. A composition according to claim 5 in which the self condensation product of dimethylolethyleneurea and polyvinylpyrrolidone, respectively, have the formulae

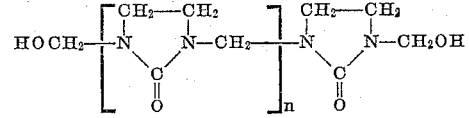

and

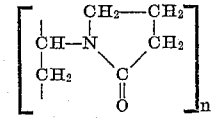

in which $n$ and $n_1$ are 2–10 and 200–400, respectively.

7. A composition according to claim 5 in which the compound is 2,2'-methylene-bis(4-methyl-6-t-butyl phenol) and the agent is a self condensation product of dimethylolethyleneurea.

8. A composition according to claim 5 in which the compound is 2,2'-methylene-bis(4-ethyl-6-butyl phenol) and the agent is a self condensation product of polyvinylpyyrolidone.

(References on following page)

References Cited in the file of this patent

UNITED STATES PATENTS

| | | |
|---|---|---|
| 2,000,152 | Walker et al. | May 7, 1935 |
| 2,467,705 | Sturgis | Apr. 19, 1949 |
| 2,538,355 | Davis et al. | Jan. 16, 1951 |

OTHER REFERENCES

Plasdone, polyvinyl pyrrolidone, New Product Bulletin No. P-100, General Aniline and Film Corporation, Commercial Development Department, General Aniline Works Division, New York, N.Y.

Polyvinyl pyrrolidone (PVP), A Useful Adjunct in Cosmetics, Herman A. Shelanski, Jour. of the Soc. of Cosmetic Chemists, vol. 5, No. 2, pp. 129 to 132.

Wilkinson et al.: "PVP in Pressurized Products," Proc. 40th Mid-Year Meeting, Chem. Spec. Man. Ass'n. May 1954, pp. 25–29.